United States Patent Office 3,355,406
Patented Nov. 28, 1967

3,355,406
SILICONE RUBBER LATEXES REINFORCED
WITH SILSESQUIOXANES
Joseph Cekada, Jr., Midland, Mich., assignor to Dow Corning Corporation, Midland, Mich., a corporation of Michigan
No Drawing. Filed Sept. 7, 1965, Ser. No. 485,556
23 Claims. (Cl. 260—29.2)

ABSTRACT OF THE DISCLOSURE

Silicone rubber latexes are reinforced by adding a silsesquioxane having the unit formula R″SiO$_{3/2}$, wherein R″ is a member selected from the group consisting of the methyl, ethyl, vinyl, phenyl and 3,3,3-trifluoropropyl radicals, said silsesquioxane having a particle size in the range of 10 to 1000 A.

---

This application is a continuation-in-part of my U.S. application Ser. No. 427,097, filed Jan. 21, 1965 and now abandoned.

This invention relates to a silicone latex and to the product made therefrom.

More specifically, this invention relates to a silicone latex comprising (1) a curable essentially linear siloxane polymer having a D.P. of at least 10 and (2) a silsesquioxane having the unit formula R″SiO$_{3/2}$, wherein R″ is a member selected from the group consisting of the methyl, ethyl, vinyl, phenyl and 3,3,3-trifluoropropyl radicals, said silsesquioxane having a particle size in the range of 10 to 1000 A. The silicone latex above can also contain a catalyst and/or a cross-linking agent.

This invention further relates to a product comprising (1) a cured essentially linear silicone polymer and (2) a silsesquioxane as defined above.

There has been a long felt need in the silicone industry for a silicone latex which would be stable on storage and from which a curable polymer could be deposited which when cured give a tough elastomer or plastic. This invention, for the first time, supplies such a latex.

The latexes of this invention are useful for depositing insulating coatings on wires; depositing inert coatings on medical devices; depositing release coatings on papers, metals and molds; depositing coatings on fabrics; depositing protective or decorative coatings on wood, metal and concrete (e.g. they are useful as silicone latex paints). Other uses of the silicone latexes of this invention will be obvious to those skilled in the art.

Any curable essentially linear silicone polymer can be employed in the latex of this invention. An example of suitable polymers are the essentially linear siloxane polymers having the general formula $$R'_x(RO)_{3-x}SiO(R'_2SiO)_nSiR'_x(OR)_{3-x}$$

In these polymers each R′ group can be the same or different and can be a hydrogen atom or any monovalent hydrocarbon or monovalent halohydrocarbon radical. Thus, for example, R′ can be an alkyl radical such as methyl, ethyl, propyl, isopropyl, butyl, amyl, hexyl, octyl, dodecyl, octadecyl or a myricyl radical; an alkenyl radical such as a vinyl, allyl, hexenyl or dodecenyl radical; an alkynyl radical such as an ethynyl or propynyl radical; a cycloaliphatic radical such as a cyclobutyl, cyclopentyl, cyclohexyl, cyclopentadienyl or a cyclohexenyl radical; an aryl radical such as a phenyl, xenyl, naphthyl or a phenanthryl radical; an alkaryl radical such as a tolyl, xylyl or a mesityl radical; an aralkyl radical such as a benzyl, phenethyl or a beta-phenylpropyl radical; or any of the corresponding halogenated hydrocarbon radicals such as a chloromethyl, gamma-bromopropyl, 3,3,3-trifluoropropyl, chlorovinyl, perfluorovinyl, chlorocyclohexyl, dichlorophenyl, alpha,alpha,alpha-trifluorotolyl or a dibromobenzyl radical. Generally speaking, it is preferred that R′ be a methyl, ethyl, vinyl, phenyl or a 3,3,3-trifluoropropyl radical.

The R group can be a hydrogen atom, a phenyl radical, a

radical, a

radical or an alkyl radical containing from 1 to 4 carbon atoms, i.e., a methyl, ethyl, propyl, isopropyl or a butyl radical. Of these groups, it is preferred that R is a hydrogen atom or a methyl radical. There can be 1, 2 or 3 of the (RO) endblocking groups depending on the value of $x$, i.e. $x$ is an integer from 0 to 2. As those skilled in the art know, there can be some small amount of (RO) groups along the polymer chain as well as on the ends.

Another example of suitable polymers are the essentially linear siloxane polymers having the general formula

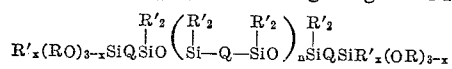

In these polymers R, R′ and $x$ have the above defined meanings.

The Q radical is divalent and is attached to each silicon atom via a Si—C (silicon to carbon) bond. This radical can be composed of either carbon and hydrogen atoms or carbon, hydrogen and oxygen atoms, any oxygen atoms being present in the form of ether linkages. This radical contains less than 15 carbon atoms and can be, for example, a methylene, ethylene, propylene, meta or paraphenylene,

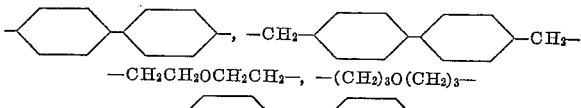

or a

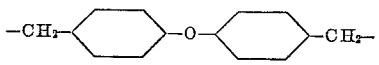

radical.

The polymers useful in the latexes of this invention must have a D.P. (degree of polymerization) of at least 10, i.e. $n$ is at least 10. These polymers can be homopolymers or copolymers and in the latter case can be either random or block in structure.

The above polymers and copolymers and many others that can be used in the latexes of this invention, as well as numerous means for their preparation, are well known to those skilled in the art. However, particularly preferred polymers for use in the latexes of this invention are those which have been prepared by emulsion polymerization employing the processes set forth in U.S. Patent 2,891,920 and Netherlands patent application No. 64—3764 which was opened to public inspection about Oct. 9, 1964 and abstracted in Derwent Netherlands Patents Report, vol. 1, No. 11, issued Oct. 29, 1964. The disclosures of the foregoing patent and patent application are incorporated herein by reference. This is not to imply that bulk or solution polymerized polymers are not useful in the latexes of this invention for, quite to the contrary, they too perform very well.

The silsesquioxane (2) employed in the latex is one having the general formula R″SiO$_{3/2}$, R″ being a methyl, ethyl, vinyl, phenyl or 3,3,3-trifluoropropyl radical. This silsesquioxane must have a particle size in the range of 10 to 1000 A if a useful rubber is to be obtained from the latex. It is preferred that the particle size be in the range of 50 to 500 A. These silsesquioxanes can be prepared by the processes set forth in U.S. patent application Ser. No. 427,077, filed Jan. 21, 1965 by Joseph Cekada, Jr. and Donald R. Weyenberg, now abandoned, and entitled "Colloidal Silsesquioxanes and Methods of Making Same." The disclosure of the above copending application is incorporated herein by reference. Briefly, these silsesquioxanes are prepared by adding a silane having the formula R″Si(OR‴)$_3$, wherein R‴ is a hydrogen atom, an alkyl group containing 1 to 4 carbon atoms (i.e. a methyl, ethyl, isopropyl or butyl group) or a

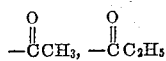

—CH$_2$CH$_2$OH, —CH$_2$CH$_2$OCH$_3$ or a —CH$_2$CH$_2$OC$_2$H$_5$ group, to a water-surfactant mixture with agitation under acidic or basic conditions. The surfactant can be either anionic or cationic in nature as defined in the foregoing application. The amount of silane employed should be less than about 10% by weight based on the combined weights of the silane, water and surfactant although up to about 35% by weight of silane can be employed if it is added to the water-surfactant mixture at the rate of less than one mol of silane per hour.

The silsesquioxanes can be employed in the form of the colloidal suspensions, as they are prepared, in making the latexes of this invention. Copolymers and blends of the silsesquioxanes can be employed in the latexes as well as the individual ones and the formula R″SiO$_{3/2}$ is intended to include such materials. It is preferred that the colloidal suspensions of the silsesquioxanes be neutral when used in the latexes. It has been found that in many instances that when the volatiles are stripped from the silsesquioxane emulsions to produce a silsesquioxane gel, that the cured product obtained when such a gel is used in the latex is much stronger than from the product obtained from the silsesquioxane as prepared.

The cross-linking agents that can be employed herein are for example silanes having the general formula A$_m$Si(OR‴)$_{4-m}$, wherein A is a member selected from the group consisting of the hydrogen atom, monovalent hydrocarbon radicals containing 1 to 6 carbon atoms and monovalent halohydrocarbon radicals containing 1 to 6 carbon atoms, R‴ is as defined above and m is zero or one. Specific illustrative examples of A are the methyl, ethyl, propyl, isopropyl, butyl, amyl, hexyl, vinyl, allyl, hexenyl, ethynyl, propynyl, cyclohexyl, phenyl, chloromethyl, gamma-bromopropyl, 3,3,3-trifluoropropyl, 3,3,-4,4,5,5,5-pentafluoropentyl and the dichlorophenyl radicals. Another example of suitable cross-linking agents are the well-known methylhydrogenpolysiloxanes, however, the above silanes, where m is one, are the preferred cross-linking agents for the latexes of this invention. It is also preferable to employ such silanes as neat liquids in preparing the latexes of this invention. Other suitable cross-linking agents that can be employed will be apparent to those skilled in the art. Whether or not one includes a cross-linker in the latex depends primarily on the functionality of the polymer and the mechanism by which the polymer cures.

Any of the well-known catalysts that do not cause breaking of the latex can be employed therein. Examples of such catalysts include condensation catalysts such as mineral acids (i.e., hydrochloric, hydrobromic, nitric and sulfuric acids), strong bases (i.e. sodium hydroxide, lithium hydroxide and quaternary ammonium hydroxides) and dialkyltin diacylates (i.e. dibutyltin dilaurate and dibutyltin diacetate). The latter compounds are particularly preferred as the condensation catalysts. The organic and inorganic peroxides, for example, benzoyl peroxide or potassium persulfate, can also be employed in the latexes. The catalysts can be added as solutions, emulsions or neat liquids in making the latexes of this invention. Other suitable catalysts will be apparent to those skilled in the art. The particular catalyst to be employed will depend on the curing mechanism of the polymer. Of course, the polymer can be cured by exposing it to a suitable radiation source in which case no catalyst would be needed.

The latexes of this invention are prepared by first making a colloidal suspension of the polymer if it is not already in such form. Any suitable dispersing agent can be employed in the preparation of the latexes. The dispersing agent can be added per se or can be the one used and present in the emulsion polymer or colloidal silsesquioxane. Specific examples of dispersing agents that can be employed are set forth in the above mentioned patent and patent applications. Then the other ingredients, the silsesquioxane, and optionally the cross-linker and catalyst, are mixed with the polymer to form the latex. Latexes prepared in the foregoing manner are stable upon standing but when applied to a substrate and the water evaporated, a film of silicone rubber or plastic is left behind depending on the polymer used in the latex. Of course in some instance it will be necessary to heat the deposited film to convert it to a rubber (for example when a peroxide curable polymer and peroxide catalyst are used) or it will be necessary to irradiate the film to convert it to a rubber. So far as is known at this time, the order in which the four ingredients of the latex are mixed is not critical. The total solids content in the latex is not critical but is preferably in the range of 5 to 20%, preferably 10 to 15%, by weight. This can vary, however, depending on the particular system.

It will be noted that while some of the ingredients of the latex are defined as containing hydrolyzable groups, all of these groups will not exist as such in the latex. However, since it is impossible to determine the specific forms in which these ingredients exist in the latex, and for the sake of clarity and ease of understanding, the ingredients have been defined as they are employed in making the latexes.

While the amounts of polymer, silsesquioxane, cross-linking agent and catalyst to be employed will depend on the particular product to be made from the latex and can easily be determined by those skilled in the art, the following proportions are given as a general guide. Generally speaking employing amounts in the range of 100 parts of polymer, 1 to 100 parts of silsesquioxane (preferably 5 to 80 parts), 0.25 to 50 parts of cross-linking agent (preferably 0.5–35 parts) and 0.25 to 5 parts of catalyst (preferably 0.5 to 3 parts) will yield the best results.

Of course, pigments, heat stability additives, fillers and other conventional additives which do not break the latex can be employed therein.

In order that those skilled in the art may better understand how the present invention can be practiced, the following examples are given by way of illustration and not by way of limitation.

All parts and percents referred to herein are on a weight basis unless otherwise specified and are based on solids content. The particle sizes of all silsesquioxanes R″SiO$_{3/2}$ in the examples are in the range of 10 to 1000 A. All colloidal suspensoins of the silsesquioxanes used in making the latexes of the examples were neutral except that used in Example 17 in which case it was acidic. The elongation, tensile strength and tension set of the rubbers and plastics produced from the latexes were measured by pulling 1 inch by ⅛ inch test bars, 20 to 80 mils thick, on an Instron tester at the rate of 2 inches per minute. The durometer was measured according to ASTM test D 676–59T. In referring to the properties of the rubbers and plastics made from the latexes of this invention, the following symbols are used: T—tensile strength in pounds per square inch, E—percent elongation at break, D—durometer and TS—percent tension set.

*Example 1*

Several silicone rubber latexes were prepared which contained 100 parts of an essentially linear two million centistoke hydroxyl endblocked polydimethylsiloxane polymer, 30 parts $C_6H_5SiO_{3/2}$, varying amounts of $C_6H_5Si(OCH_3)_3$ and 1 part of dibutyltin dilaurate. The latexes were spread on a surface and the water evaporated at room temperature and atmospheric pressure leaving silicone rubber films behind. The amounts of phenyltrimethoxysilane employed and the properties of the resulting rubber films are set forth in the table below.

| Parts $C_6H_5Si(OCH_3)_3$ | T (p.s.i.) | E (Percent) | D (points) | TS (Percent) |
|---|---|---|---|---|
| 1 | 240 | 1,163 | 20 | 75 |
| 3 | 260 | 748 | 36 | 31 |
| 5 | 373 | 810 | 36 | 36 |
| 10 | 344 | 726 | 37 | 26 |
| 15 | 365 | 850 | 39 | 31 |
| 20 | 356 | 700 | 54 | 19 |

*Example 2*

The procedure of Example 1 was repeated except that 50 parts of $C_6H_5SiO_{3/2}$ was employed. The amounts of phenyltrimethoxysilane employed and the properties of the resulting rubber films are set forth in the table below.

| Parts $C_6H_5Si(OCH_3)_3$ | T (p.s.i.) | E (Percent) | D (points) | TS (Percent) |
|---|---|---|---|---|
| 1 | 520 | 1,263 | 38 | 116 |
| 3 | 734 | 1,126 | 34 | 95 |
| 5 | 797 | 1,048 | 50 | 84 |
| 10 | 699 | 1,143 | 39 | 102 |
| 15 | 608 | 610 | 38 | 110 |
| 20 | 612 | 940 | 41 | 98 |

*Example 3*

The procedure of Example 1 was repeated except that varying amounts of $C_6H_5SiO_{3/2}$ were employed and 5 parts of $C_6H_5Si(OCH_3)_3$. The amounts of phenylsilsesquioxane employed and the properties of the resulting rubber films are set forth in the table below.

| Parts $C_6H_5SiO_{3/2}$ | T (p.s.i.) | E (Percent) | D (points) | TS (Percent) |
|---|---|---|---|---|
| 10 | 145 | 731 | 17 | 19 |
| 20 | 292 | 952 | 28 | 49 |
| 30 | 373 | 810 | 36 | 36 |
| 40 | 468 | 1,290 | 33 | 137 |
| 50 | 797 | 1,048 | 50 | 84 |
| 60 | 710 | 1,510 | 36 | 228 |

*Example 4*

Several silicone rubber latexes were prepared which contained 100 parts of an essentially linear two million centistoke hydroxyl endblocked polydimethylsiloxane polymer, 20 parts of $CH_3SiO_{3/2}$, varying amounts of $CH_3Si(OCH_3)_3$ and 1 part of dibutyltin dilaurate. The latexes were spread on a surface and the water evaporated as in Example 1 leaving silicone rubber films behind. The amounts of methyltrimethoxysilane employed and the properties of the resulting rubber films are set forth in the table below.

| Parts $CH_3Si(OCH_3)_3$ | T (p.s.i.) | E (percent) | TS (percent) | D (points) |
|---|---|---|---|---|
| 1 | 351 | 734 | 25 | 45 |
| 3 | 454 | 710 | 20 | 43 |
| 5 | 367 | 625 | 17 | 54 |
| 10 | 362 | 372 | 5 | 57 |
| 15 | 402 | 410 | 10 | 56 |

*Example 5*

The procedure of Example 4 was repeated except that 40 parts of cross-linked $CH_2=CHSiO_{3/2}$ was employed and $CH_2=CHSi(OCH_3)_3$ was substituted for the $$CH_3Si(OCH_3)_3$$

The amounts of vinyltrimethoxysilane employed and the properties of the resulting rubber films are set forth in the table below.

| Parts $CH_2=CHSi(OCH_3)_3$ | T (p.s.i.) | E (percent) | D (points) | TS (percent) |
|---|---|---|---|---|
| 1 | 455 | 510 | 53 | 22 |
| 3 | 341 | 175 | 49 | 2 |
| 5 | 378 | 351 | 47 | 10 |
| 10 | 391 | 435 | 50 | 15 |
| 15 | 419 | 475 | 67 | 22 |
| 20 | 319 | 155 | 62 | 0 |

*Example 6*

The procedure of Example 4 was repeated except that the latex employed contained 100 parts of the same polymer, varying amounts of cross-linked $CH_2=CHSiO_{3/2}$, 1 part of $CH_2=CHSi(OCH_3)_3$ and 1 part of dibutyltin dilaurate. The amounts of vinylsilsesquioxane employed and the properties of the resulting rubber films are set forth in the table below.

| Parts cross-linked $CH_2=CHSiO_{3/2}$ | T (p.s.i.) | E (percent) | D (points) | TS (percent) |
|---|---|---|---|---|
| 20 | 234 | 535 | 30 | 8 |
| 40 | 455 | 510 | 53 | 22 |
| 60 | 296 | 102 | 66 | 0 |
| 80 | 494 | 20 | 55 | 0 |

*Example 7*

The procedure of Example 4 was repeated except that the latex contained 100 parts of an essentially linear two million centistoke hydroxyl endblocked copolymer of 30 mol percent phenylmethylsiloxane units and 70 mol percent of dimethylsiloxane units, 10 parts of $CH_3SiO_{3/2}$, varying amounts of $C_6H_5Si(OCH_3)_3$ and 1 part of dibutyltin dilaurate. The amounts of methyltrimethoxysilane employed and the properties of the resulting rubber films are set forth in the table below.

| Parts $C_6H_5Si(OCH_3)_3$ | T (p.s.i.) | E (percent) | TS (percent) | D (points) |
|---|---|---|---|---|
| 3 | 160 | 300 | 10 | |
| 5 | 210 | 209 | 7 | |
| 10 | 280 | 140 | 0 | |
| 15 | 291 | 95 | 3 | 45 |
| 20 | 371 | 60 | 0 | 56 |
| 25 | 290 | 50 | 0 | |
| 30 | 328 | 102 | 5 | |

*Example 8*

The procedure of Example 7 was repeated except that 40 parts of $CH_3SiO_{3/2}$ was employed. The amounts of phenyltrimethoxysilane employed and the properties of the resulting rubber films are set forth in the table below.

| Parts $C_6H_5Si(OCH_3)_3$ | T (p.s.i.) | E (percent) | D (points) | TS (percent) |
|---|---|---|---|---|
| 5 | 370 | 111 | 63 | 8 |
| 10 | 537 | 22 | | 0 |
| 15 | 611 | 18 | 54 | 0 |

*Example 9*

The procedure of Example 7 was repeated except that varying amounts of $CH_3SiO_{3/2}$ and 10 parts of $C_6H_5Si(OCH_3)_3$ were employed. The amounts of methylsilsesquioxane employed and the properties of the resulting rubber films are set forth in the table below.

| Parts $CH_3SiO_{3/2}$ | T (p.s.i.) | E (percent) |
|---|---|---|
| 10 | 280 | 140 |
| 20 | 400 | 80 |
| 40 | 535 | 22 |

*Example 10*

Three silicone rubber latexes were prepared which contained 100 parts of an essentially linear two million centistoke hydroxyl endblocked polydimethylsiloxane polymer, 20 parts of a $C_6H_5SiO_{3/2}$—$CH_3SiO_{3/2}$ copolymer containing 75 mol percent $C_6H_5SiO_{3/2}$ units and 25 mol percent $CH_3SiO_{3/2}$ units, varying amounts of $CH_3Si(OCH_3)_3$ and 1 part of dibutyltin dilaurate. The latexes were spread on a surface and the water evaporated as in Example 1 leaving silicone rubber films behind. The amounts of methyltrimethoxysilane employed and the properties of the resulting rubber films are set forth in the table below.

| Parts $CH_3Si(OCH_3)_3$ | T (p.s.i.) | E (percent) | D (points) | TS (percent) |
|---|---|---|---|---|
| 3 | 69 | 202 | 12 | 9 |
| 5 | 136 | 165 | 23 | 15 |
| 10 | 175 | 90 | 43 | 3 |

*Example 11*

The procedure of Example 4 was repeated except that the latex contained 100 parts of the same polymer, 20 parts of $CF_3CH_2CH_2SiO_{3/2}$, varying amounts of $CH_3Si(OCH_3)_3$ and 1 part of dibutyltin dilaurate. The amounts of methyltrimethoxysilane employed and the properties of the resulting rubber films are set forth in the table below.

| Parts $CH_3Si(OCH_3)_3$ | T (p.s.i.) | E (percent) | TS (percent) |
|---|---|---|---|
| 1 | 70 | 485 | 16 |
| 10 | 184 | 473 | 37 |
| 15 | 216 | 355 | 27 |
| 25 | 203 | 132 | 8 |

*Example 12*

The procedure of Example 11 was repeated except that 10 parts of 3,3,3-trifluoropropylsiloxane was employed. The amounts of methyltrimethoxysilane and the properties of the resulting rubber films are set forth in the table below.

| Parts $CH_3Si(OCH_3)_3$ | T (p.s.i.) | E (percent) | TS (percent) |
|---|---|---|---|
| 5 | 92 | 765 | 46 |
| 10 | 195 | 424 | 31 |
| 15 | 236 | 345 | 18 |
| 20 | 268 | 215 | 7 |

*Example 13*

The procedure of Example 4 was repeated except that the latex contained 100 parts of an essentially linear two million centistoke hydroxyl endblocked polydimethylsiloxane polymer, 60 parts of $C_6H_5SiO_{3/2}$, varying amounts of  and 1 part of dibutyltin dilaureate. The amounts of phenyltrimethoxysilane employed and the properties of the resulting rubber films are set forth in the table below.

| Parts $C_6H_5Si(OCH_3)_3$ | T (p.s.i.) | E (Percent) | TS (Percent) | D (points) |
|---|---|---|---|---|
| ½ | 213 | 1,620 | 275 | 35 |
| 1 | 490 | 1,479 | 227 | 36 |
| 3 | 555 | 1,250 | 185 | 45 |
| 5 | 710 | 1,510 | 228 | 36 |
| 10 | 225 | 1,500 | | |

*Example 14*

The procedure of Example 13 was repeated except that 40 parts of the phenylsilsesquioxane was employed. The amounts of phenyltrimethoxysilane employed and the properties of the resulting rubber films are set forth in the table below.

| Parts $C_6H_5Si(OCH_3)_3$ | T (p.s.i.) | E (Percent) | TS (Percent) | D (points) |
|---|---|---|---|---|
| 1 | 360 | 1,270 | 39 | 31 |
| 3 | 270 | 925 | 97 | 30 |
| 5 | 468 | 1,290 | 137 | 33 |
| 10 | 410 | 1,180 | 117 | 24 |

*Example 15*

The procedure of Example 13 was repeated except that 20 parts of the phenylsilsesquioxane was employed. The amounts of phenyltrimethoxysilane employed and the properties of the resulting rubber films are set forth in the table below.

| Parts $C_6H_5Si(OCH_3)_3$ | T (p.s.i.) | E (Percent) | TS (Percent) | D (points) |
|---|---|---|---|---|
| ½ | 142 | 1,287 | 95 | 12 |
| 1 | 180 | 1,150 | 66 | 18 |
| 3 | 254 | 970 | 54 | 26 |
| 5 | 292 | 952 | 49 | 28 |
| 10 | 143 | 762 | 33 | 32 |

*Example 16*

The procedure of Example 13 was repeated except 10 parts of the phenylsilsesquioxane was employed. The amounts of phenyltrimethoxysilane employed and the properties of the resulting rubber films are set forth in the table below.

| Parts $C_6H_5Si(OCH_3)_3$ | T (p.s.i.) | TS (Percent) | E (Percent) | D (points) |
|---|---|---|---|---|
| 1 | 147 | 64 | 1,320 | 11 |
| 3 | 121 | 21 | 700 | 10 |
| 5 | 145 | 19 | 731 | 17 |
| 10 | 135 | 10 | 569 | 14 |
| 15 | 142 | 5 | 437 | 20 |
| 20 | 179 | 9 | 548 | 19 |
| 30 | 319 | 24 | 800 | 27 |
| 35 | 545 | 68 | 1,558 | 26 |

*Example 17*

A silicone rubber latex was prepared which contained 12.3 g. of emulsion polymerized essentially linear hydroxyl two million centistoke endblocked polydimethylsiloxane polymer, 3.69 g. of $C_6H_5SiO_{3/2}$, 2.4 g. of $Si(OC_2H_5)_4$ and dodecylbenzenesulfonic acid. This latex was spread on a surface and the water allowed to evaporate as in Example 1. A very elastic silicone rubber film was deposited on the surface.

*Example 18*

A silicone rubber latex was prepared which contained 100 parts of an essentially linear two million centistoke hydroxyl endblocked polydimethylsiloxane polymer, 80 parts of $C_6H_5SiO_{3/2}$, 5 parts of $Si(OC_2H_5)_4$ and 1 part of dibutyltin dilaurate. This latex was spread on a surface and the water allowed to evaporate as in Example 1. A fairly strong silicone rubber film was deposited on the surface.

Example 19

A silicone rubber latex was prepared which contained 100 parts of an essentially linear two million centistoke hydroxyl endblocked polydimethylsiloxane polymer, 20 parts of $CH_3SiO_{3/2}$, 10 parts of a liquid methylhydrogenpolysiloxane and 1 part of dibutyltin dilaurate. This latex was spread on a surface and the water allowed to evaporate as in Example 1. A silicone rubber film was left on the surface.

Example 20

Two silicone rubber latexes were prepared which contained 100 parts of an essentially linear two million centistoke hydroxyl endblocked polydimethylsiloxane polymer, 40 parts of $CH_3SiO_{3/2}$, 1 part of $CH_3Si(OCH_3)_3$ and 1 part of dibutyltin dilaurate. In one of the latexes the particle size of the $CH_3SiO_{3/2}$ was about 35 A. while in the other the particle size was about 160 A. These latexes were spread on a surface and the water allowed to evaporate as in Example 1. The properties of the silicone rubber films deposited on the surface were as follows.

| | T (p.s.i.) | E (percent) | TS (percent) | D (points) |
|---|---|---|---|---|
| 35 A. $CH_3SiO_{3/2}$ | 313 | 78 | 6 | |
| 160 A. $CH_3SiO_{3/2}$ | 632 | 694 | 24 | 62 |

Example 21

A silicone rubber latex was prepared which contained 100 parts of an essentially linear 55,000 cs. hydroxyl endblocked polydimethylsiloxane polymer, 20 parts of $CH_3SiO_{3/2}$, 3 parts of $CH_3Si(OCH_3)_3$ and 1 part of dibutyltin dilaurate. The latex was spread on a surface and the water evaporated as in Example 1 causing silicone rubber to be deposited on the surface. The rubber had a tensile strength of 293 p.s.i., 98% elongation, a durometer of 43 and 3% tension set.

Example 22

Two silicone rubber latexes were prepared as in the preceding example except that a 10,000 cs. polymer was employed and 1 and 3 parts of $CH_3Si(OCH_3)_3$ were used. Rubber was deposited from each latex as in the previous example. The rubber from the latex containing 1 part of $CH_3Si(OCH_3)_3$ had a tensile strength of 540 p.s.i., 86% elongation, a durometer of 53 and 2% tension set. The rubber from the latex containing 3 parts of $CH_3Si(OCH_3)_3$ has a tensile strength of 467 p.s.i., 43% elongation, a durometer of 48 and 3% tension set.

Example 23

One liter of a neutral colloidal suspension of $CH_3SiO_{3/2}$ containing about 5.5% silsesquioxane solids was evaporated on a Rinco evaporator over a period of several days to obtain a thick gel which contained about 28.5% silsesquioxane solids.

A silicone rubber latex was prepared by mixing 25.4 g. of the above silsesquioxane gel, 58.2 g. of an emulsion containing about 31% hydroxyl endblocked polydimethylsiloxane polymer solids, 0.18 g. of methyltrimethoxysilane and 20 drops of an emulsion containing about 35% dibutyltin dilaurate solids.

A second silicone rubber latex was prepared which was identical to the one above except that 131 g. of the silsesquioxane suspension containing 5.5% solids was employed instead of the gel.

Films were cast from the above latexes and allowed to dry for three days. The film from the latex containing the silsesquioxane gel was much stronger than the other film.

Example 24

When any of the following essentially linear silicone polymers are substituted for those in the preceding examples, latexes which yield silicone rubber are obtained.

(A) A methoxy endblocked polymethylethylsiloxane polymer.

(B) An ethoxy endblocked polydimethylsiloxane-polymethyl-3,3,3-trifluoropropylsiloxane copolymer.

(C) An isopropoxy endblocked polydimethylsiloxane-polymethylcyclohexylsiloxane copolymer.

(D) A butoxy endblocked polydimethylsiloxanepolyethylbutylsiloxane copolymer.

(E) A phenoxy endblocked polydimethylsiloxanepolymethylphenylsiloxane-polymethylvinylsiloxane copolymer.

(F) A hydroxyl endblocked polydimethylsiloxane-polymethyloctadecylsiloxane copolymer.

(G) A methoxy endblocked polydimethylsiloxane-polymethyl-alpha,alpha,alpha-trifluorotolylsiloxane copolymer.

(H) A hydroxyl endblocked polydimethylsiloxanepolyethylbenzylsiloxane copolymer.

(I) An isopropoxy endblocked polymethylchloropropylsiloxane copolymer.

(J) A methoxy endblocked polydimethylsiloxanepolymethylnaphthylsiloxane-polymethylvinylsiloxane copolymer.

(K) A methoxy endblocked polydimethylsiloxane-polymethylphenylsiloxane - polymethylchlorophenylsiloxane copolymer.

(L) A hydroxyl endblocked polydimethylsiloxane-polyethyltolylsiloxane copolymer.

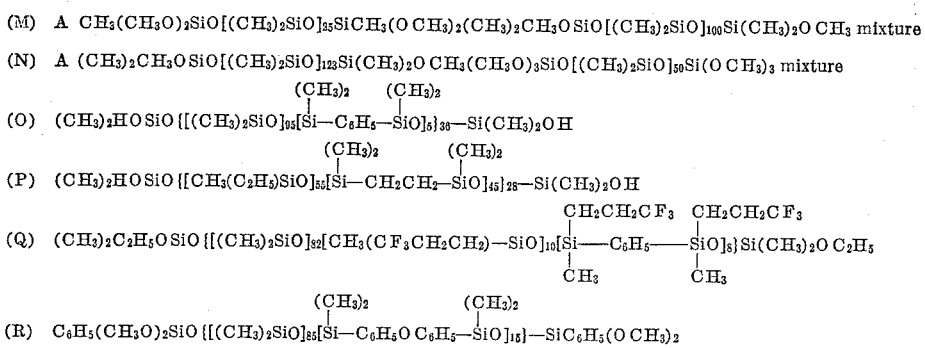

Example 25

When any of the following silsesquioxanes are substituted for the silsesquioxanes employed in the preceding examples, latexes which yield silicone rubber are obtained.

(A) $C_2H_5SiO_{3/2}$ (B) A $CH_3SiO_{3/2}$-$C_2H_5SiO_{3/2}$ copolymer (C) A $CH_3SiO_{3/2}$-$C_6H_5SiO_{3/2}$ blend (D) A $CH_3SiO_{3/2}$-$CF_3CH_2CH_2SiO_{3/2}$ copolymer (E) A $CH_3SiO_{3/2}$-$CH_2$=$CHSiO_{3/2}$ blend (F) A $C_2H_5SiO_{3/2}$-$CH_2$=$CHSiO_{3/2}$ copolymer (G) A $C_2H_5SiO_{3/2}$-$C_6H_5SiO_{3/2}$ copolymer
(H) A $CH_3SiO_{3/2}$-$C_6H_5SiO_{3/2}$-$CF_3CH_2CH_2SiO_{3/2}$ copolymer

*Example 26*

When any of the following cross-linking agents are substituted for those of the preceding examples, latexes which yield silicone rubber are obtained.

(A) $C_2H_5Si(OC_2H_5)_3$
(B) $CH_3Si(OC_3H_7)_3$
(C) $CH_3Si(OC_4H_9)_3$
(D) $C_3H_7Si(OCH_3)_3$
(E) $C_6H_{11}Si(OC_2H_5)_3$
(F) $ClCH_2Si(OCH_3)_3$
(G) $C_6H_5Si(OH)_3$
(H) $CF_3CH_2CH_2Si(OC_2H_5)_3$-$CF_3CF_2CF_2CH_2CH_2Si(OC_2H_5)_3$ mixture
(I) $CH_3Si(OC_2H_5)_3$-$Si(OC_2H_5)_4$ mixture
(J) $CH_3Si(OCH_3)_3$-$CF_3CH_2CH_2Si(OC_2H_5)_3$ mixture

*Example 27*

Several silicone latexes were prepared which contained 100 parts of an essentially linear polymer having the general formula $HO[(CH_3)_2SiC_6H_5Si(CH_3)_2O]_nH$, 10 parts of $CH_3SiO_{3/2}$, varying amounts of $CH_3Si(OCH_3)_3$ and 1 part of dibutyltin dilaurate. The latexes were spread on a surface and the water evaporated as in Example 1. The amounts of methyltrimethoxysilane employed and the properties of the resulting films are set forth in the table below. The asterisk in the table indicates that the properties of the films were measured as cast without further treatment. The properties of all the other films were measured after the films had been heated at 145° C. for about 15 minutes and then allowed to cool back to room temperature.

| Parts $CH_3Si(OCH_3)_3$ | T (p.s.i.) | E (percent) | TS (percent) |
|---|---|---|---|
| 10* | 2,160 | 11 | 0 |
| 15* | 2,120 | 68 | 35 |
| 1 | 1,930 | 190 | 138 |
| 3 | 1,740 | 280 | 199 |
| 5 | 2,060 | 180 | 126 |
| 10 | 2,740 | 170 | 112 |
| 15 | 1,970 | 95 | 58 |

*Example 28*

When any of the following essentially linear polymers are substituted for the polymer in the preceding example, similar results are obtained.

(A) $HO[(CH_3)_2SiCH_2CH_2Si(CH_3)_2O]_{25}H$ (B)

(C)
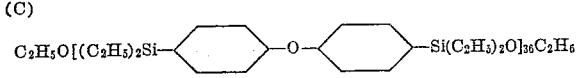

(D) $CH_3O[(CH_3)_2Si(CH_2)_3O(CH_2)_3Si(CH_3)_2O]_{28}CH_3$ (E) $HO[(CH_3)CF_3CH_2CH_2SiC_6H_5SiCH_2CH_2CF_3(CH_3)O]_{41}H$ (F)
$HO[(CH_3)CF_3CH_2CH_2SiC_6H_5SiCH_2CH_2CF_3(CH_3)O]_5[Si(CH_3)_2O]_{62}H$ (G)
$CH_3O[(CH_3)_2SiC_6H_5Si(CH_3)_2O]_{10}[SiC_6H_5(CH_3)O]_5[Si(CH_3)_2O]_{85}$—$CH_3$

*Example 29*

A silicone latex was prepared which contained 100 parts of an essentially linear hydroxyl endblocked polydimethylsiloxane polymer and 40 parts of $C_6H_5SiO_{3/2}$.

When a cross-linking agent, such as $CH_3Si(OCH_3)_3$ or $C_6H_5Si(OCH_3)_3$, and a catalyst, such as dibutyltin dilaurate or dibutyltin diacetate, are added to the above latex a silicone rubber film can be deposited therefrom employing the procedure of Example 1.

Alternatively, when the polymer and silsesquioxane are deposited from the latex and the resulting film irradiated, a rubber is produced.

*Example 30*

A Silicone latex was prepared from 400 g. of an emulsion of an essentially linear two million centistoke hydroxyl endblocked polydimethylsiloxane polymer, said polymer having been prepared in the emulsion and said emulsion having a solids content of about 31%, 935 g. of a colloidal suspension of $CH_3SiO_{3/2}$ having a solids content of about 3.5%, and 1.24 g. of $CH_3Si(OCH_3)_3$.

When a catalyst such as dibutyltin dilaurate is added to the above latex, a silicone rubber film can be deposited therefrom employing the procedure of Example 1.

*Example 31*

A silicone latex can be made which contains 100 parts of an essentially linear hydroxyl endblocked polydimethylsiloxane polymer, 40 parts of $C_6H_5SiO_{3/2}$ and 1 part of dibutyltin diacetate.

When a cross-linking agent such as $C_6H_5Si(OCH_3)_3$ is added to the above latex, a silicone rubber film can be deposited therefrom employing the procedure of Example 1.

*Example 32*

15 g. of n-dodecylbenzene sulfonic acid was weighed into a two liter beaker, 634 g. of distilled water added, and the mixture agitated until solution was complete. Then a previously prepared mixture of 1 g. of ethylorthosilicate and 350 g. of dimethylcyclotetrasiloxane was added and mixed in to form a pre-emulsion. The pre-emulsion was homogenized at 6000 p.s.i. and then placed in a three-necked, round bottom flask equipped with a thermocouple well, stirrer and reflux condenser. The emulsion was heated to 80° C., maintained at that temperature with agitation for four hours, then cooled to 45° C. and allowed to stand at this temperature overnight after which the emulsion was neutralized to a pH of 7.5 with an 80% aqueous solution of triethanolamine.

A silicone rubber latex was prepared by adding 928.6 g. of a colloidal suspension of $CH_3SiO_{3/2}$ containing 5% silsesquioxane solids and 1.8 g. of a dibutyltin dilaurate emulsion to 928.6 g. of the emulsion of the copolymer prepared above. A good silicone rubber film or coating can be deposited from this latex.

That which is claimed is:
1. A silicone latex comprising
   (1) a curable essentially linear silicone polymer having a D.P. of at least 10 and, as a reinforcing agent
   (2) a silsesquioxane having the unit formula $R''SiO_{3/2}$, wherein R'' is a member selected from the group consisting of the methyl, ethyl, vinyl, phenyl and 3,3,3-trifluoropropyl radicals, said silsesquioxane having a particle size in the range of 10 to 1000 A.
2. The latex of claim 1 wherein (1) is essentially a methyl silicone polymer and (2) is $CH_3SiO_{3/2}$.
3. The latex of claim 1 wherein (1) is essentially a methyl silicone polymer and (2) is $C_6H_5SiO_{3/2}$.
4. The latex of claim 1 wherein (1) is essentially a phenylmethyl silicone polymer and (2) is $CH_3SiO_{3/2}$.
5. The latex of claim 1 wherein (1) is essentially a phenylmethyl silicone polymer and (2) is $C_6H_5SiO_{3/2}$.
6. The latex of claim 1 wherein (1) is essentially a 3,3,3-trifluoropropylmethyl silicone polymer and (2) is $CH_3SiO_{3/2}$.
7. The latex of claim 1 wherein (1) is essentially a 3,3,3-trifluoropropylmethyl silicone polymer and (2) is $CF_3CH_2CH_2SiO_{3/2}$.
8. The latex of claim 1 wherein the silsesquioxane has a particle size in the range of 50 to 500 A.
9. The latex of claim 1 which also contains a catalyst.

10. The latex of claim 8 which also contains a catalyst.

11. The latex of claim 1 which also contains a cross-linking agent.

12. The latex of claim 8 which also contains a cross-linking agent.

13. The latex of claim 9 which also contains a cross-linking agent.

14. The latex of claim 10 which also contains a cross-linking agent.

15. A product comprising (1) a cured essentially linear silicone polymer and, as a reinforcing agent; (2) a silsesquioxane having the unit formula R''SiO$_{3/2}$, wherein R'' is a member selected from the group consisting of the methyl, ethyl, vinyl, phenyl and 3,3,3-trifluoropropyl radicals, said silsesquioxane having had a particle size in the range of 10 to 1000 A.

16. The product of claim 15 wherein the substituents on the silicone polymer are selected from the group consisting of the methyl, phenyl, vinyl and 3,3,3-trifluoropropyl radicals.

17. The product of claim 15 wherein the silsesquioxane had a particle size in the range of 50 to 500 A.

18. The product of claim 16 wherein the silsesquioxane had a particle size in the range of 50 to 500 A.

19. The latex of claim 1 wherein (2) is in the form of a gel.

20. The latex of claim 9 wherein (2) is in the form of a gel.

21. The latex of claim 11 wherein (2) is in the form of a gel.

22. The latex of claim 13 wherein (2) is in the form of a gel.

23. The product of claim 15 wherein (2) is in the form of a gel.

References Cited

UNITED STATES PATENTS

| | | | |
|---|---|---|---|
| 2,884,388 | 4/1959 | Hedland | 260—827 |
| 3,170,890 | 2/1965 | Boyd et al. | 260—824 |
| 3,294,738 | 12/1966 | Krantz | 260—29.2 |

MURRAY TILLMAN, *Primary Examiner.*

M. J. TULLY, *Assistant Examiner.*